Nov. 29, 1927.
L. JOHNSON
METHOD OF SEPARATING BUTTER FATS, ETC
Original Filed Jan. 7, 1922    2 Sheets-Sheet 1
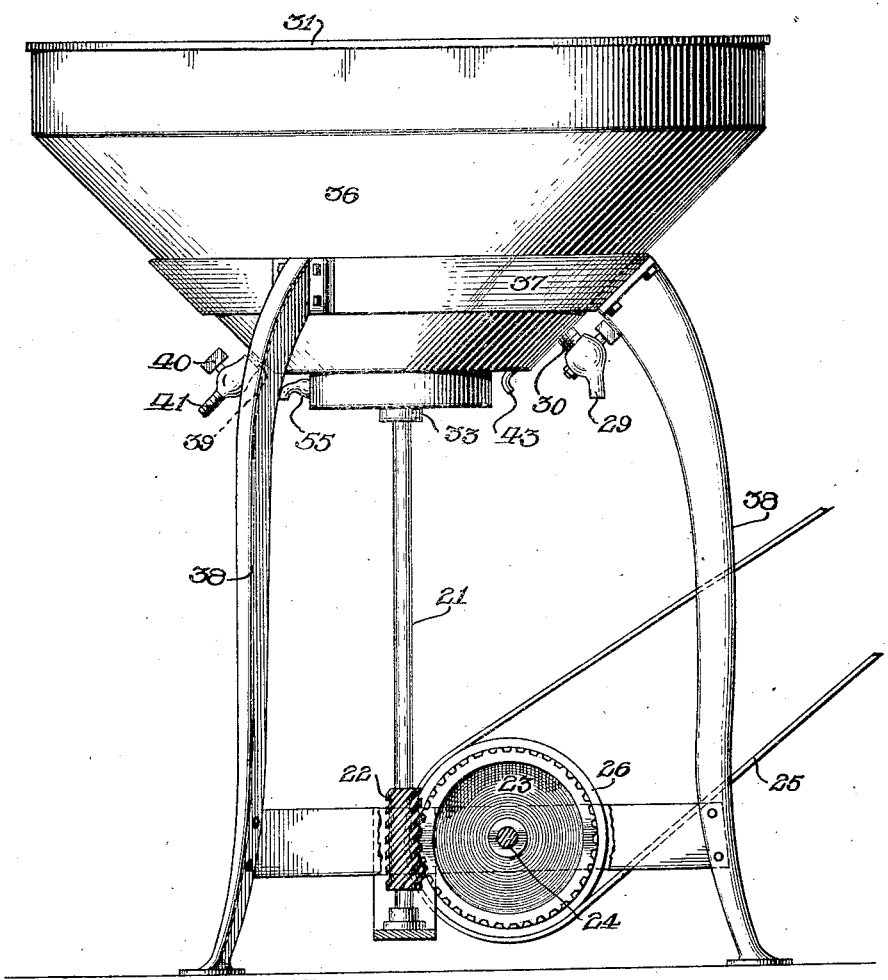
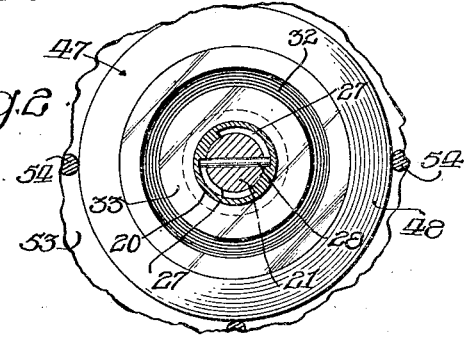

Nov. 29, 1927.  1,651,028
L. JOHNSON
METHOD OF SEPARATING BUTTER FATS, ETC
Original Filed Jan. 7, 1922  2 Sheets-Sheet 2
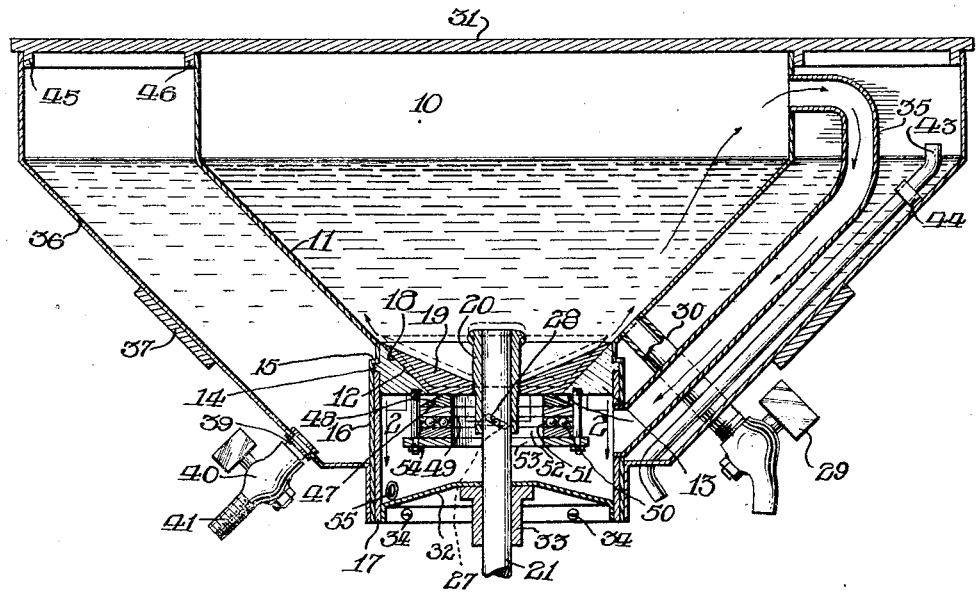
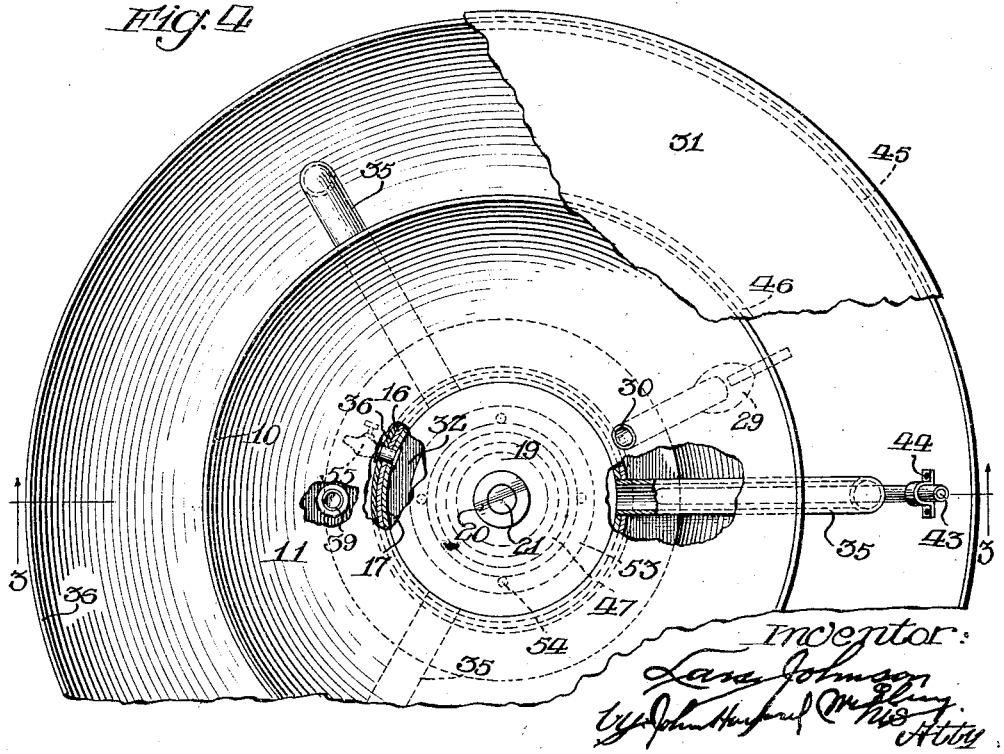
Inventor:
Lars Johnson Patented Nov. 29, 1927.

1,651,028

UNITED STATES PATENT OFFICE.

LARS JOHNSON, OF CHICAGO, ILLINOIS.

METHOD OF SEPARATING BUTTER FATS, ETC.

Application filed January 7, 1922, Serial No. 527,776. Renewed May 12, 1927.

My invention is concerned with a novel method of separating butter fats from whole milk or cream, and is designed to enable me to churn a given quantity of milk or cream in a shorter time than has been heretofore possible due to the more rapid action of my novel method.

Heretofore, so far as I am aware, churning has been accomplished mainly by an agitation of the milk or cream, which agitation served to break up the coatings of the fat cells and cause their ultimate coherence into masses of butter fat. By my invention I supplement this agitation by the introduction of air rising through the agitated liquid which air assists in the breaking up of the coatings of the fat cells and in carrying the butter fat thus released to the surface where it coheres with the fat already there, and so rapidly assembles the butter fat in the desired masses ready for the final working to make butter.

For the carrying out of my novel method, I have invented certain novel apparatuses by which it may be efficiently operated, one of which I will describe at length hereinafter, although the preferred form is shown in my application No. 734,952, filed August 29, 1924, the patent for which may be issued simultaneously herewith.

To illustrate my invention, I annex hereto two sheets of drawings, in which the same reference characters are used to designate identical parts in all the figures of which—

Fig. 1 is a side elevation of a novel churn for carrying out my novel process;

Fig. 2 is a detail in section, on an enlarged scale on the line 2—2 of Fig. 3;

Fig. 3 is a central vertical section on the line 3—3 of Fig. 4; and

Fig. 4 is a top plan view with some of the parts broken away.

In a simple form of an apparatus by which my novel method may be conveniently carried out, I employ a holder or receptacle, preferably composed of metal having its interior surface enameled, and conveniently consisting of the top cylindrical portion 10, which is supported by the truncated conical continuation 11 thereof, the inner inclined surface of which has its continuation in the correspondingly inclined and tapered inner surface 12 of the annulus 13, which is of metal and has its surface 12 ground. This annulus may be provided with the external flange 14 which is held against the under side of the offset 15 in the cylindrical extension 16 of the portion 11 by the annular sleeve 17 fitted in said extension. Co-operating with the tapered surface 12 is the correspondingly tapered surface 18 of a disk or closure 19, which is preferably secured on the sleeve 20 which is mounted to slide up and down a very short distance on the supporting shaft 21, which shaft, as seen in Fig. 1, is provided with suitable gearing for driving it at a high rate of speed, such as the screw gearing 22 engaged by the driving gearing 23 secured on the shaft 24 and driven by the belt 25 actuated from any suitable source of power and co-operating with the belt wheel 26 secured on the shaft 24. The sleeve 20 is provided on its interior with a pair of diametrically opposed inclined grooves 27, into which fit the ends of the pin 28 passed through and secured in the shaft 21. The shaft 21 if rotated in one direction, through the action of the ends of the pin 28 on the cam grooves 27 raises the disk 19 from the full line position shown in Fig. 3 to the dotted line position, in which the ends of the pin 28 have reached the lower ends of the inclined grooves, and of course the disk 19 is rotated at the same high velocity as the shaft 21. When shaft 21 is stopped or slowed down relative to the speed of the disk 19, the ends of the pin 28 move to the higher ends of the cam slots 27 and bring the disk 19 to its full line position.

So much of the apparatus as has been thus far described represents a simple means for carrying out my novel process, and in operation the cream is poured into the receptacle up to the bottom of the cylindrical portion 10, and obviously when the apparatus is at rest, the bottom is closed by the disk 19 having its surface 18 substantially seated on the surface 12. When the shaft 21 is rotated, and rises to the desired speed, the disk 19 is lifted up toward the dotted line position shown in Fig. 3, but the high speed of rotation draws in air by the centrifugal action between the now separated surfaces 12 and 18, and this air is broken up or atomized by the centrifugal action and rises through the body of the cream which is agitated by the action of the rapidly rotating disk 19 on the lower portion thereof. This agitation, with the large quantity of finely divided air rising through the body of the cream serves to break up the coverings of the butter fat cells and carry the butter fat to the surface, where the various particles cohere and form lumps. When the agitation has been continued long enough to complete the churning, the shaft 21 is stopped, and the disk 19 is at once brought down so that its surface 18 is seated substantially on the surface 12, and the buttermilk is prevented from flowing out at the bottom. The butter may now be skimmed off of the top, after which the buttermilk may be discharged in any desired manner, as by opening the stop-cock 29 connected to the discharge pipe 30 opening into the bottom of the truncated conical portion 11 near the seat 12.

As this method may be sometimes employed in localities where the air is foul, and it would be undesirable to introduce a fresh supply of foul air constantly into the cream, I preferably provide a cover 31 for the receptacle, and in the bottom of the sleeve 17 I provide the closure disk 32, which is located above the bearing 33 therein, and which may be removably secured in place by the screws 34 passed through the downwardly projecting flange at the periphery of the disk and through the sleeve 17 into a portion 16 of the holder. To carry the air which has risen through the milk or cream from above it back to the bottom, I preferably employ a plurality of tubes 35, which open into the cylindrical portion 10 at a point well above the top of the cream and which extend down to and open into the space between the disk 32 and the closure 19 by having their ends passed through openings in the portion 16 and the sleeve 17.

I may also provide means for controlling the temperature of the milk or cream during the churning operation, as it is possible to secure better results by operating at a certain temperature, and for this purpose I may enclose the container in a similarly shaped water jacket 36 which is shown as supported in the ring 37 which in turn is supported by three or more legs 38. The lower end of the water jacket 36 is made integral with or secured to the lower end of the portion 16 by a water-tight joint. To control the temperature, I preferably pass through the bottom of the water jacket 36 a pipe 39 which will have a valve 40 in its lower end and a nipple 41 by which it may be connected to any desired supply pipe. To insure a circulation, I provide upon the opposite side the overflow pipe 43, the height of the upper end of which determines the water level, and which has its upper end supported in the bracket 44, while its lower end passes out by a water-tight connection through the jacket 36. If a constant supply of water at the desired temperature preferably 67° Fahrenheit be furnished the pipe 39, by opening the valve 40 to the desired extent, the quantity of water flowing into and around the jacket and out through the pipe 43 may be regulated with any desired degree of nicety. The cover 31 preferably has the pair of downwardly extending flanges 45 and 46 co-operating with the top of the water jacket and of the holder, respectively.

As a convenient support for the rotating disk or closure 19, I may provide the annulus 47, which has its outer surface 48 tapered as shown, so as to leave a space through which any butter that might be caught between the surfaces 12 and 18 may be squeezed out when the disk 19 seats itself. This annulus 47 is secured upon the annulus 49 rolling on the balls 50 secured in any suitable retaining ring 51, which balls in turn roll on the annulus 52, which is supported on the annulus 53 suspended from the annulus 13 by the pins 54. The surface 18 of the closure 19 does not seat itself air tight upon the surface 12 of the annulus 13, but the ball bearings are adjusted so that they are separated enough so the closure 19 can rotate freely on the ball bearings, but not enough so that any appreciable amount of cream or buttermilk can pass between them in starting and finishing the separating process. I preferably employ a faucet 55 opening into the chamber enclosing the ball bearings so that any buttermilk which might accumulate in it can be drawn off when necessary.

While I have shown and described my invention as carried out by the use of one form of apparatus, it will be understood that it is capable of modifications, and that I do not desire to be limited in the interpretation of the following claims, except as may be necessitated by the state of the prior art. For instance, where it is to be used in churning milk, instead of cream, I will make the portion 10 much deeper, so it will hold, say, four times as much milk as cream. If it is desired to use the apparatus for condensing milk, etc., the pipes 35 would be omitted, and a large supply of preferably heated air would be forced up through the milk and drawn off of the top thereof, thereby evaporating it rapidly.

I claim:

1. A novel method of separating butter fats from their associated liquid, which consists in applying a movement of rotation to the truncated bottom of an inverted conically shaped body of liquid and in simultaneously introducing a finely divided gas by centrifugal action to said bottom, which gas in rising aids in separating the particles of butter fat and in carrying them to the top of the liquid.

2. A novel method of separating butter fats from their associated liquid, which consists in simultaneously agitating the liquid in a covered receptacle by imparting motion to the liquid by applying power thereto, and introducing into the bottom of the liquid a finely divided gas which rises through the agitated liquid and is then carried from above the top of the liquid back again to the bottom so that the gas is used repeatedly and in rising aids in separating the particles of butter fat and in carrying them to the top of the liquid.

In witness whereof, I have hereunto set my hand this 26th day of April, A. D. 1921.

LARS JOHNSON.